US011326692B2

(12) United States Patent
Kimes et al.

(10) Patent No.: US 11,326,692 B2
(45) Date of Patent: May 10, 2022

(54) ROTATIONAL CONTROL ASSEMBLY FOR A VEHICLE TRANSMISSION

(71) Applicant: Sigma Powertrain, Inc., Livonia, MI (US)

(72) Inventors: John Kimes, Wayne, MI (US); Jeffrey Viola, Berkley, MI (US)

(73) Assignee: Sigma Powertrain, Inc., Livonia, MI (US)

( * ) Notice: Subject to any disclaimer, the term of this patent is extended or adjusted under 35 U.S.C. 154(b) by 122 days.

(21) Appl. No.: 16/989,803

(22) Filed: Aug. 10, 2020

(65) Prior Publication Data

US 2021/0041022 A1 Feb. 11, 2021

Related U.S. Application Data

(60) Provisional application No. 62/884,441, filed on Aug. 8, 2019.

(51) Int. Cl.
*F16H 63/34* (2006.01)
*F16H 59/08* (2006.01)
(Continued)

(52) U.S. Cl.
CPC ......... *F16H 63/3475* (2013.01); *F16H 59/08* (2013.01); *F16H 59/38* (2013.01); *F16H 61/32* (2013.01); *F16H 2059/081* (2013.01)

(58) Field of Classification Search
CPC ...... F16H 63/3475; F16H 59/08; F16H 59/38; F16H 61/32; F16H 2059/081
See application file for complete search history.

(56) References Cited

U.S. PATENT DOCUMENTS

| 2,658,683 | A | * | 11/1953 | Rabenda | ................ | G06K 17/00 |
| | | | | | | 235/432 |
| 4,817,471 | A | * | 4/1989 | Tury | ....................... | F16H 59/12 |
| | | | | | | 477/121 |

(Continued)

FOREIGN PATENT DOCUMENTS

| WO | 2016160100 A1 | 10/2016 | |
| WO | WO-2021026542 A1 * | 2/2021 | ............. F16H 59/08 |

OTHER PUBLICATIONS

ISR for PCT/US2020/045677.
(Continued)

*Primary Examiner* — David M Fenstermacher
(74) *Attorney, Agent, or Firm* — Simonelli IP, PLLC

(57) ABSTRACT

A rotational control assembly controls at least one locking element used to lock a race with respect to a housing. The rotational control assembly includes a speed sensor disposed adjacent the race. The speed sensor senses a rotational speed of the race and generating a rotational speed signal. A controller is electrically connected to the speed sensor for receiving the rotational speed signal. The controller includes a comparator to compare the rotational speed signal to a threshold speed level. A lockout switch is electrically connected to the controller. The lockout switch prevents activation of the at least one locking element when the rotational speed signal exceeds the threshold speed level. This assembly prevents attempts to synchronize or lock races when the speeds are too high. This assembly can also be used to facilitate park and hill-hold functions.

20 Claims, 11 Drawing Sheets

(51) Int. Cl.
*F16H 61/32* (2006.01)
*F16H 59/38* (2006.01)

(56) References Cited

U.S. PATENT DOCUMENTS

| | | | | |
|---|---|---|---|---|
| 4,821,590 | A * | 4/1989 | Tury | F16H 59/70 |
| | | | | 74/335 |
| 4,905,530 | A * | 3/1990 | Stehle | F16H 59/0204 |
| | | | | 477/99 |
| 4,932,281 | A | 6/1990 | Ordo | |
| 5,035,158 | A * | 7/1991 | Leigh-Monstevens | |
| | | | | F16H 59/08 |
| | | | | 477/36 |
| 5,243,522 | A * | 9/1993 | Salzmann | F16H 59/08 |
| | | | | 477/121 |
| 5,696,679 | A * | 12/1997 | Marshall | B60T 1/005 |
| | | | | 192/222 |
| 6,514,174 | B2 * | 2/2003 | Iida | F16H 61/0213 |
| | | | | 477/125 |
| 7,019,479 | B2 * | 3/2006 | Tobias | B62D 5/0484 |
| | | | | 318/400.21 |
| 7,075,195 | B2 | 7/2006 | Feil | |
| 7,176,643 | B2 * | 2/2007 | Yamada | F16H 61/32 |
| | | | | 318/3 |
| 8,589,040 | B2 * | 11/2013 | Nishida | F16H 59/20 |
| | | | | 701/52 |
| 9,758,169 | B2 * | 9/2017 | Umayahara | B60L 7/26 |
| 10,829,109 | B2 * | 11/2020 | Manivasagam | F16H 63/48 |
| 11,174,941 | B2 * | 11/2021 | Dietlmeier | F16H 61/12 |
| 2002/0079190 | A1 | 6/2002 | Burger | |
| 2009/0051349 | A1 | 2/2009 | Fruehling | |
| 2009/0105898 | A1 | 4/2009 | Wu | |
| 2009/0277738 | A1 | 11/2009 | Papania | |
| 2013/0169199 | A1 | 7/2013 | Vanko | |
| 2014/0188352 | A1 | 7/2014 | Yu | |
| 2021/0041022 | A1 * | 2/2021 | Kimes | F16D 41/14 |

OTHER PUBLICATIONS

Written Opinion of ISA for PCT/US2020/045677 dated Oct. 26, 2020.
ISR and Written Opinion for PCT/US2020/045677.

* cited by examiner

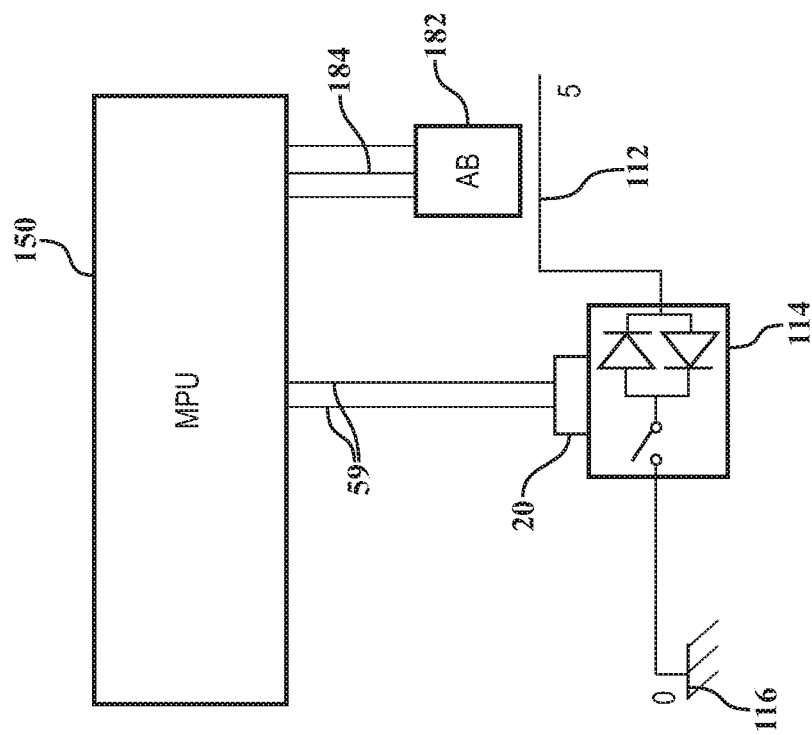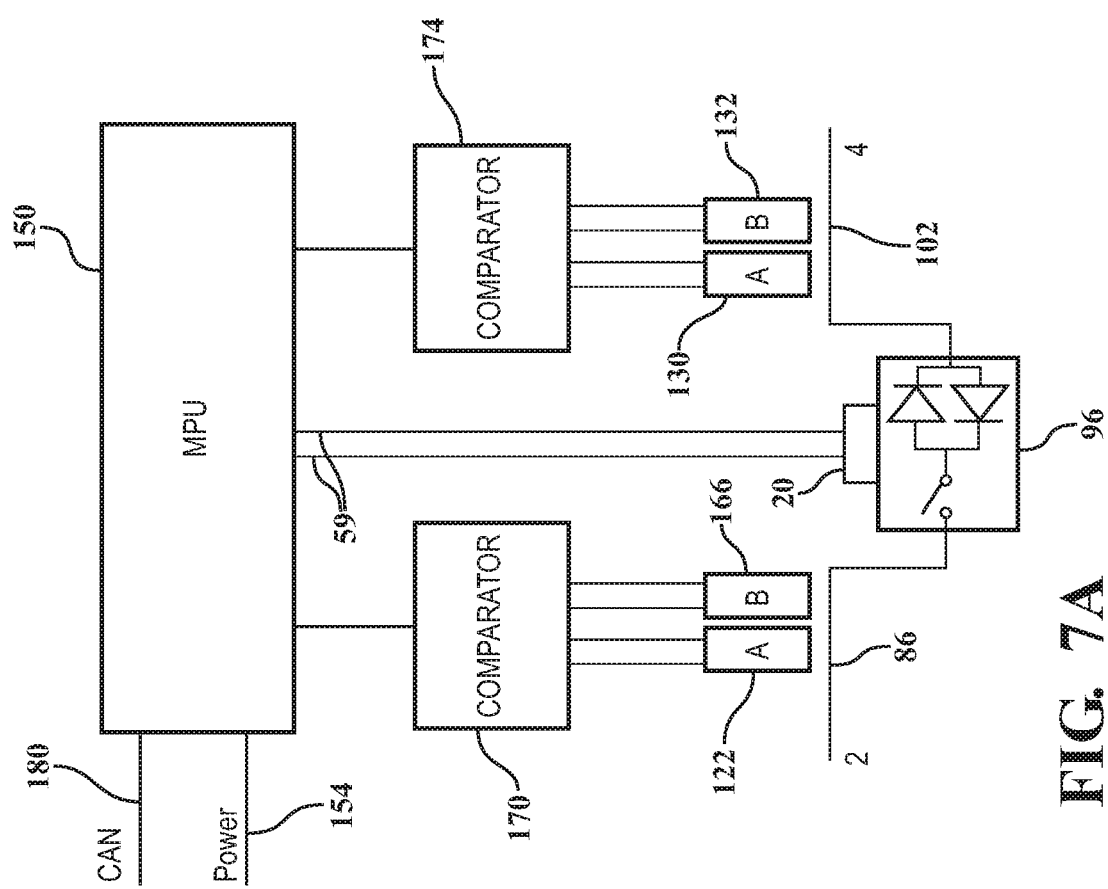
FIG. 7B
FIG. 7A

ROTATIONAL CONTROL ASSEMBLY FOR A VEHICLE TRANSMISSION

BACKGROUND ART

1. Field of the Invention

The invention relates to a powertrain assembly for a vehicle movable using a motive power. More particularly, the invention relates to a control assembly for a powertrain preventing race locking at high rotational speeds.

2. Description of the Related Art

All electric, hybrid electric, and plug-in hybrid electric vehicles (collectively referred to as EVs) have a powertrain to transfer power from various power generators to the driven wheels of the vehicle. Traditional transmissions utilize hydraulics and friction to operate. These two performance principles work well in the traditional transmission when powered by an internal combustion engine. The physics of these traditional transmission result in extreme amounts of energy waste preventing the EVs from reaching ranges that make them a commercially viable option to the vehicles powered solely by internal combustion engines.

SUMMARY OF THE INVENTION

A rotational control assembly controls at least one locking element used to lock a race with respect to a housing. The rotational control assembly includes a speed sensor disposed adjacent the race. The speed sensor senses a rotational speed of the race and generating a rotational speed signal. A controller is electrically connected to the speed sensor for receiving the rotational speed signal. The controller includes a comparator to compare the rotational speed signal to a threshold speed level. A lockout switch is electrically connected to the controller. The lockout switch prevents activation of the at least one locking element when the rotational speed signal exceeds the threshold speed level.

BRIEF DESCRIPTION OF THE DRAWINGS

Advantages of the invention will be readily appreciated as the same becomes better understood by reference to the following detailed description when considered in connection with the accompanying drawings, wherein:

FIG. 7A is a simplified view of a portion of the embodiment shown in FIG. 6;

FIG. 7B is a simplified view an alternative embodiment of the rotational control assembly;

DETAILED DESCRIPTION OF THE PREFERRED EMBODIMENTS

Figure 1:
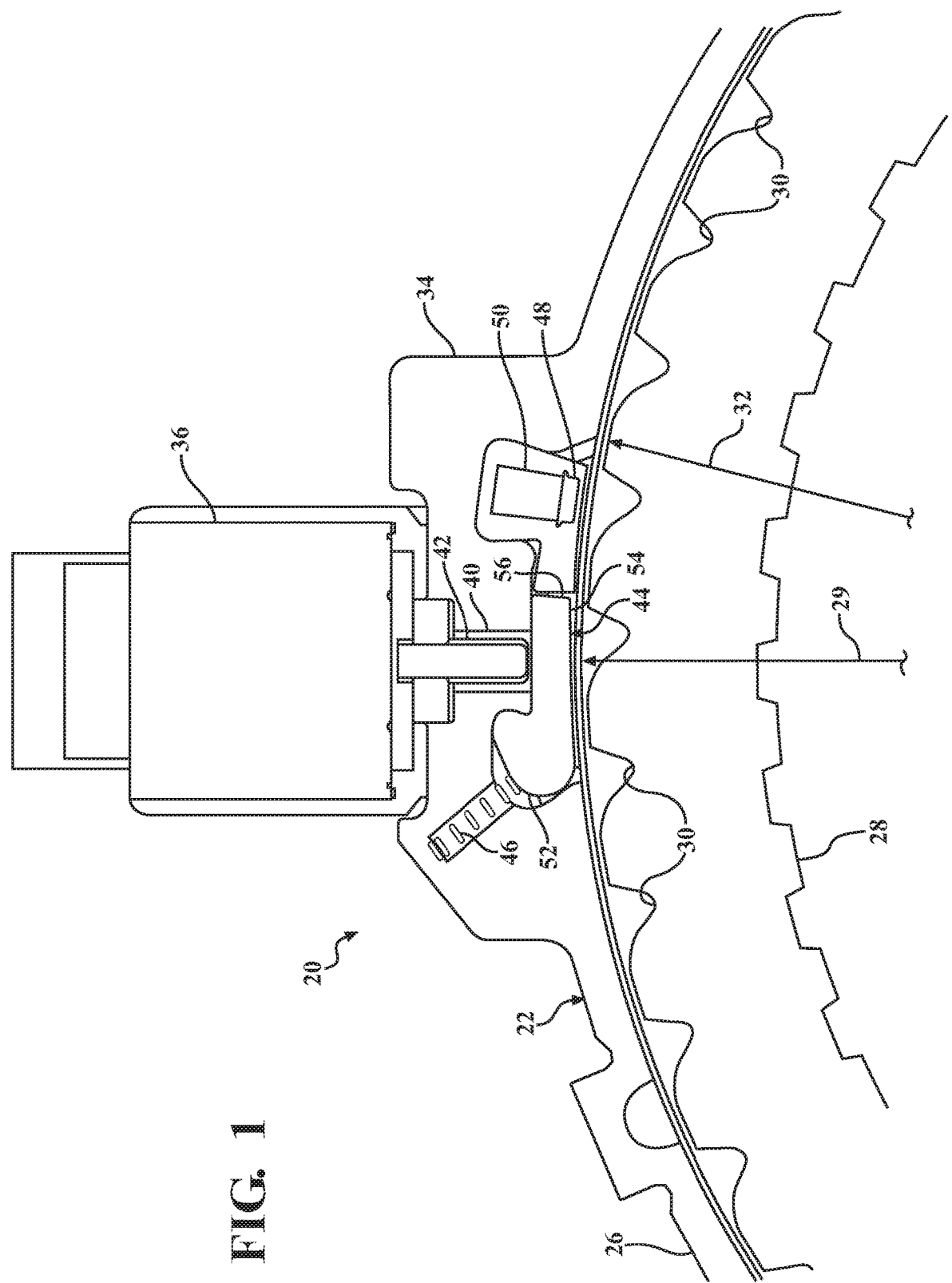
FIG. 1 is a side view of one embodiment of a rotational control assembly.

Referring to FIG. 1, a rotatable control assembly is generally shown at 20 and integrally connected to a controllable coupling device 22. In the embodiment shown, the controllable coupling device 22 is a clutch and, more specifically, a brake clutch. There may be a plurality of rotatable control assemblies 20 for any one controllable coupling device 22. In one embodiment, there are several rotatable control assemblies 20 spaced equidistantly apart from one another about the circumference of the controllable coupling device 22.

Figure 3:
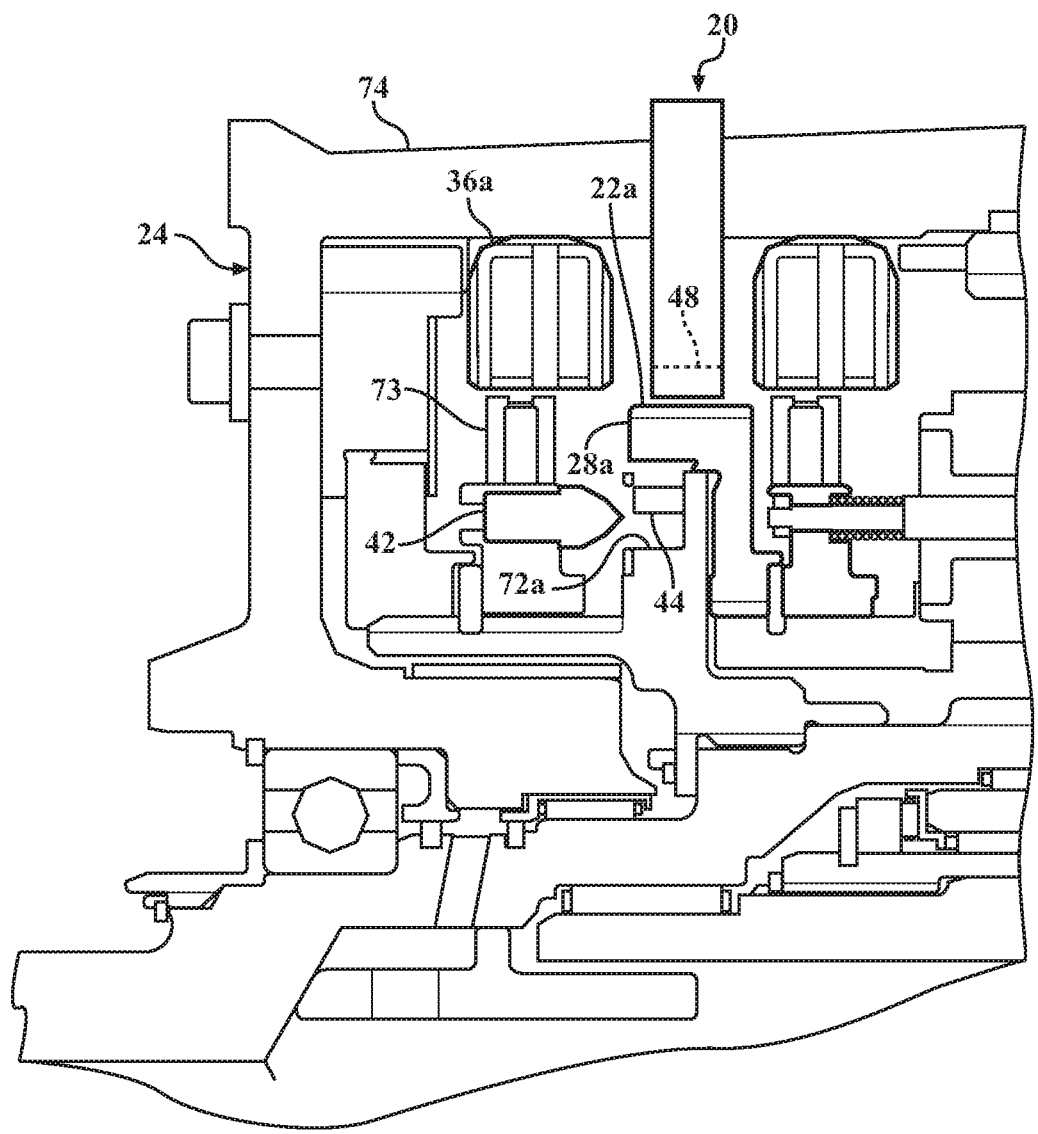
FIG. 3 is a partial side view of the rotational control assembly mounted within a second embodiment of a transmission, partially cut away.
Figure 4:
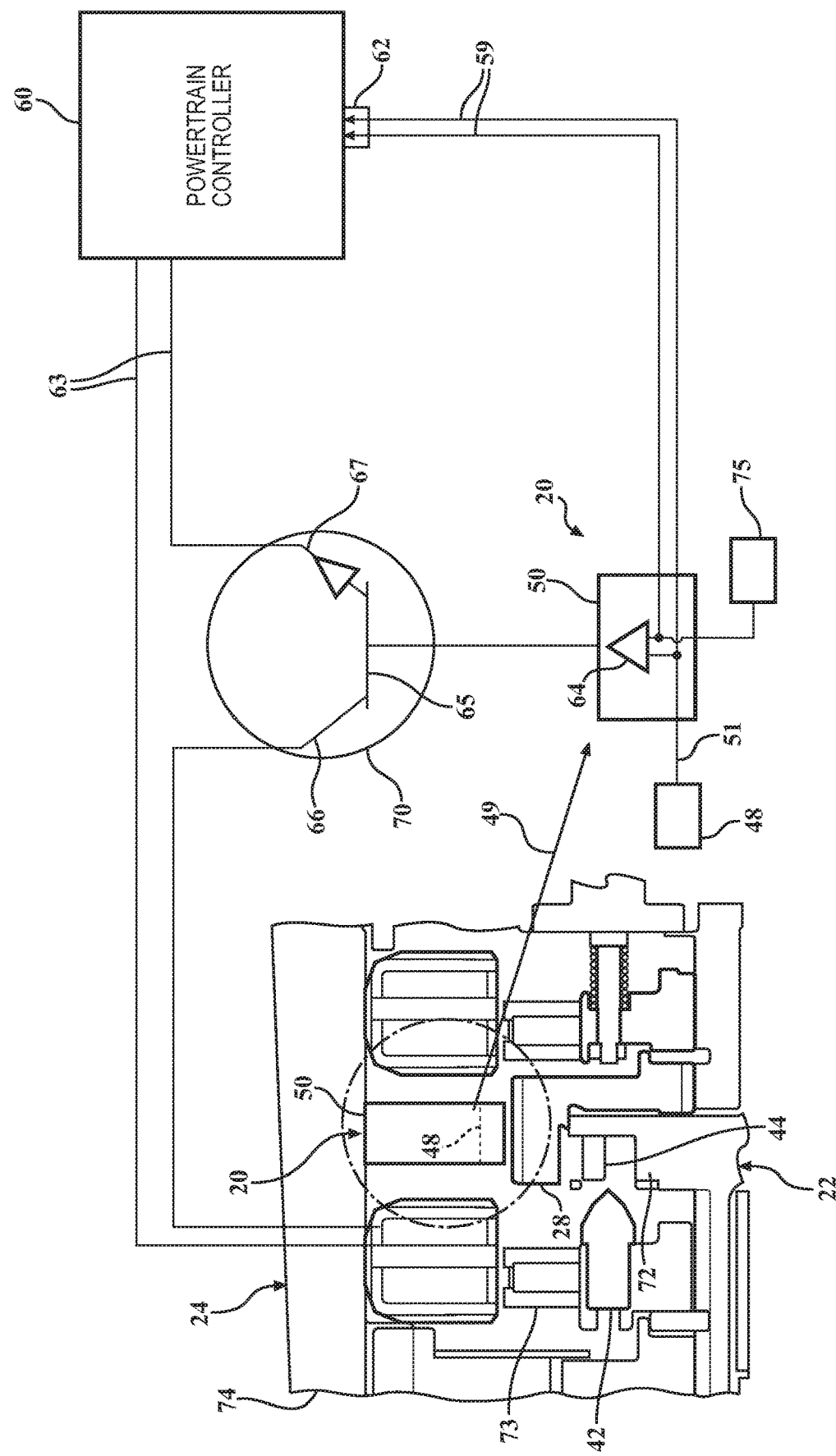
FIG. 4 is a hybrid combination side view and block diagram of the embodiment of FIG. 3.
Figure 5:
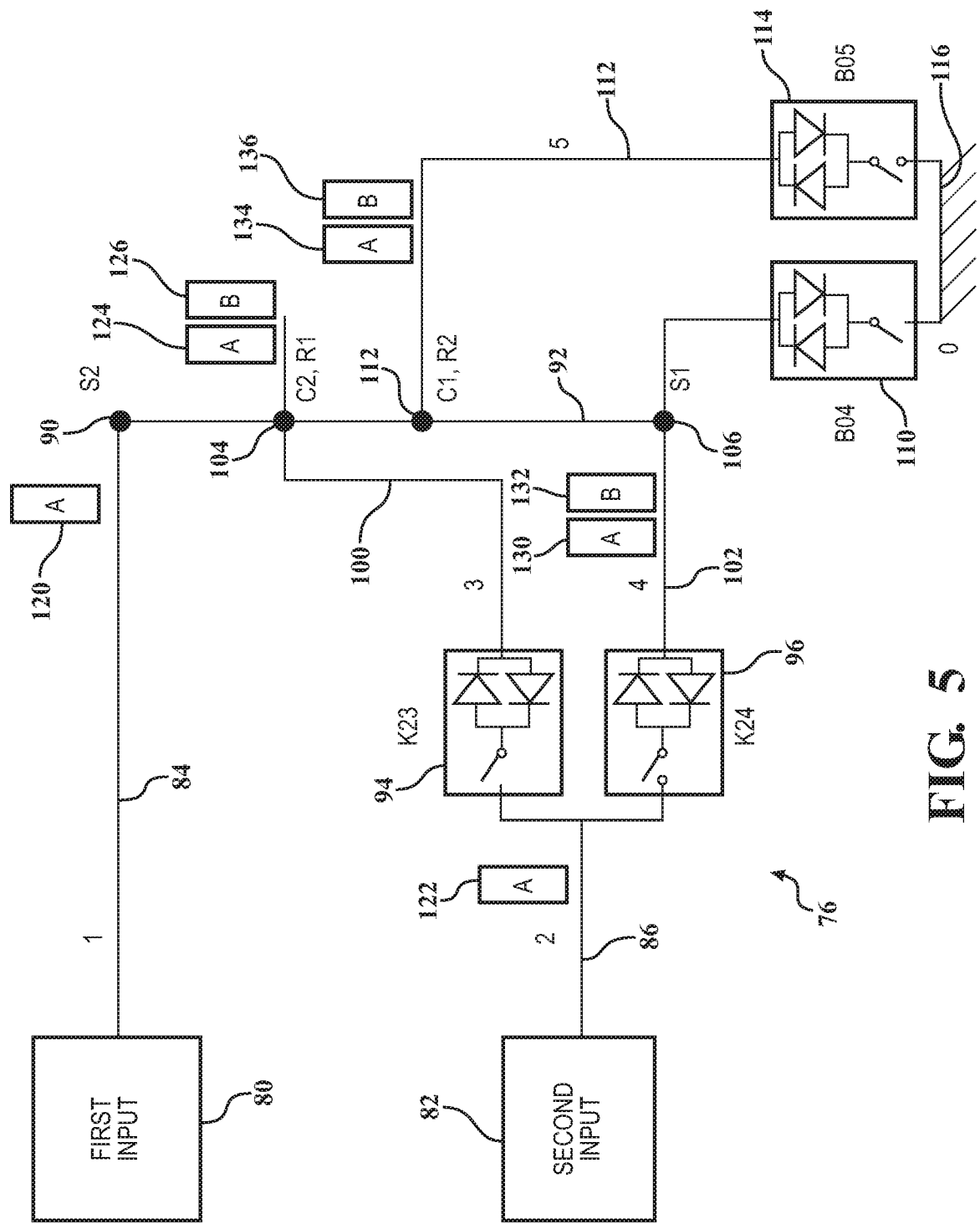
FIG. 5 is a lever diagram of a powertrain incorporating one embodiment of the rotational control assembly.

The controllable coupling device 22 is a part of a transmission 24, portions one example of which are shown in FIGS. 3-5. Details of transmissions similar to the transmission 24 are disclosed in U.S. Pat. No. 10,711,867 and US Publication 2019/0225073, both of which are assigned to Applicant and are hereby expressly incorporated by reference.

For the brake clutch 22 of FIG. 1, an object, namely a grounded outer race 26, encircles a rotatable race 28; in this instance, a notch plate 28. The outer race 26 defines an inner diameter 29 and a central axis (seen in FIGS. 11A and 11B as 327). The rotatable notch plate 28 includes a plurality of notches 30 that are formed in an outer diameter 32 of the rotating notch plate 28. The outer race 26 includes a lock housing 34 within which a locking element activator 36 is mounted. In the embodiment shown, the locking element activator 36 is a solenoid and the lock housing is a solenoid housing 34.

The lock housing 34 includes a port 40 through which a plunger 42 extends. In FIG. 1, the plunger 42 is a solenoid plunger 42 and it is shown in the retracted position. Depending on the design of the solenoid 36 used, the solenoid plunger 42 may be retracted because it is spring-biased into the retracted position or because the solenoid plunger 42 is magnetically latched in that position. How the solenoid plunger 42 retracts is based on the design of the solenoid 36, which designs are known to those skilled in the art.

Also enclosed within the lock housing port 40 are a locking element, generally shown at 44, a return spring 46, and at least one speed sensor 48. The locking element 44 is a strut including a cam end 52, a distal arm 54 and a notch-engaging surface 56. The return spring 46 applies a spring force to the cam end 52 of the strut 44, whereas the distal arm 54 of the strut 44 selectively receives a force from the solenoid plunger 42. When the solenoid plunger 42 is forced into its extended position, it overcomes the spring force of the return spring 46 on the cam end 52 of the strut 44 and forces the distal arm 54 of the strut 44 out from the lock housing port 40. The distal arm 54 extends into the outer diameter 32 of the rotating notch plate 28. When the notch engaging surface 56 at the end of the distal arm 54 engages one of the plurality of notches 30, the strut 44 forces the rotating notch plate 28 to stop rotating and prevents the notch plate 28 from starting to rotate. The strut 44 transfers the force received from the rotating notch plate 28 into the lock housing 34 of the outer race 26.

Figure 2:
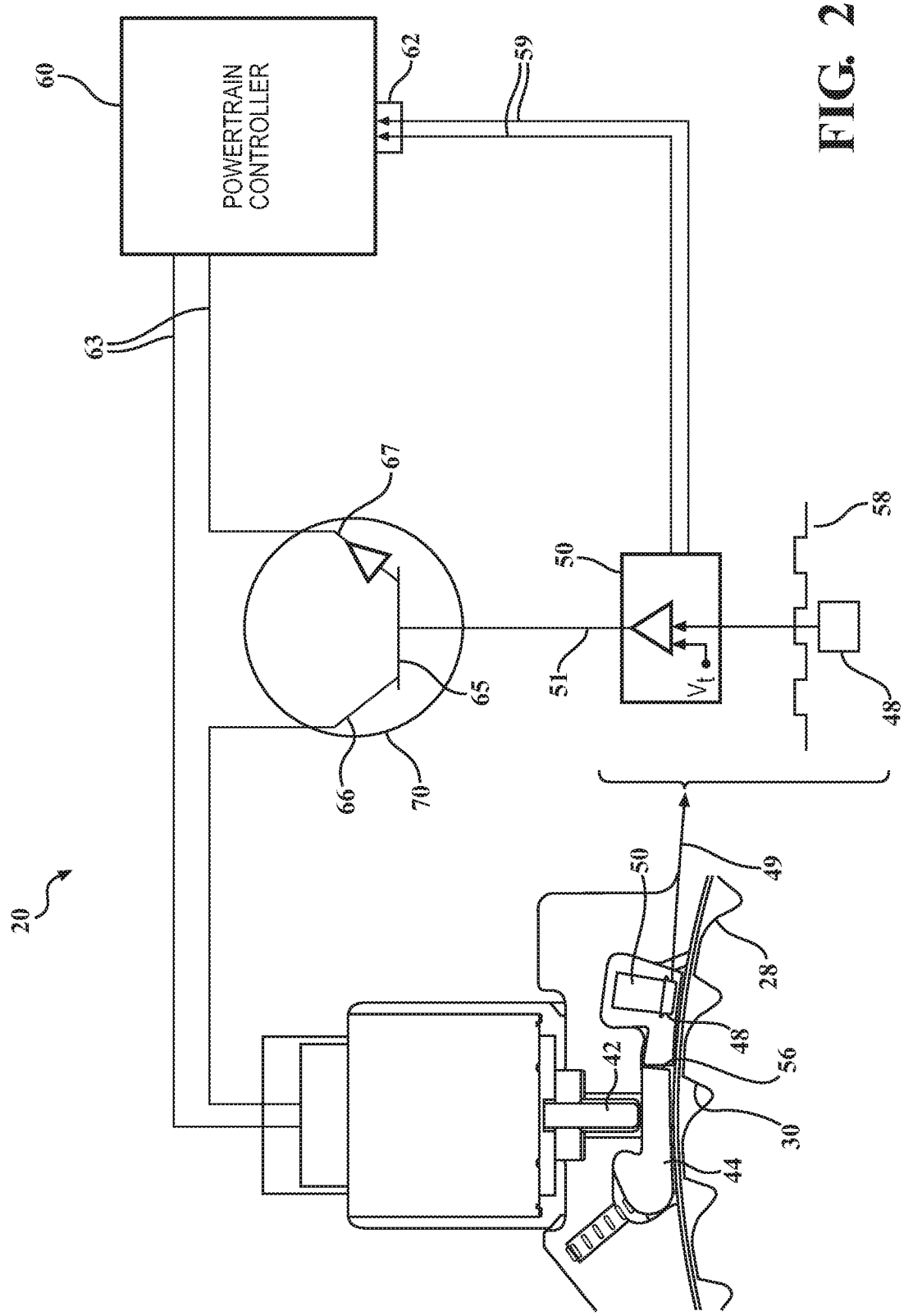
FIG. 2 is a hybrid combination side view and block diagram of the embodiment of FIG. 1.

Referring to FIGS. 1 and 2, the rotational control assembly 20 includes the at least one speed sensor 48 which is shown disposed adjacent the controllable coupling device 22. The at least one speed sensor 48 may also be located away from the controllable coupling device 22. In such instances, the at least one speed sensor 48 is positioned to measure the rotational speed of a rotating piece that is attached to or rotating with the controllable coupling device 22. In one instance the at least one speed sensor 48 could be measuring the rotational speed of a shaft that is fixedly secured the race 28 of the controllable coupling device 22. In such instances, it will not be necessary for the at least one speed sensor 48 to be housed within the housing port 40 of the lock housing 34.

The at least one speed sensor 48 generates a rotational speed signal 58 of the rotating notch plate 28 with respect to the grounded outer race 26 to which the at least one speed sensor 48 may be secured. In one embodiment, the at least one speed sensor 48 is a Hall Effect sensor. It should be appreciated by those skilled in the art that suitable sensors other than Hall Effect sensors may be used. An arrow 49 represents a graphic transition in FIGS. 2 and 4 from a side view of the rotational control assembly 20 to a block view wherein the at least one sensor 48 is shown in both portions of these Figures.

A controller 50 is electrically connected to the at least one speed sensor 48. In one embodiment shown in FIGS. 2 and 4, the controller 50 is fixedly secured to the rotational speed sensor 48. As is shown in FIG. 2, the speed sensor 48 generates a rotational speed signal 58, which is a step wave signal. It should be appreciated by those skilled in the art that the form of the rotational speed signal 58 may vary.

An input port 62 for a powertrain controller 60 receives a rotational speed signal forwarded on by the controller 50 through conductors 59. Among other things, the powertrain controller 60 provides power to the solenoid 36 through conductors 63. The powertrain controller 60 provides the general instruction as to activation state of the solenoid 36.

In the embodiment shown in FIG. 2, the controller 50 includes a comparator 64 to compare the rotational speed signal 58 to a threshold speed level, represented by a threshold voltage, $V_t$, which is predetermined. If the rotational speed signal indicates the rotating notch plate 28 is rotating below the threshold speed level, the controller 50 provides an output signal of 0 V at output lead 51. If the rotational speed signal indicates the rotating notch plate 28 is rotating above the threshold speed level, the controller 50 provides an output of 5 V at the output lead 51. It should be appreciated by those skilled in the art that voltage levels of the output signal can be any level so long as they are predetermined and measurably distinct.

The rotational control assembly 20 also includes a lockout switch 70 electrically connected to the controller 50 via the output lead 51. The lockout switch 70 prevents activation of the solenoid 36 when the rotational speed signal exceeds the threshold speed level. The solenoid 36 acts as a locking element activator when it forces the solenoid plunger 42 into the strut 44, acting as the locking element, which in turn is forced into one of the plurality of notches 30 of the notch plate 28 stopping the notch plate 28 from rotating. In the embodiment shown in FIGS. 2 and 4, the lockout switch 70 is shown as a bipolar junction transistor with the output lead 51 connected to a base 65, and a collector 66 and emitter 67 connected to one of the conductors 63 between the powertrain controller 60 and the solenoid 36. Therefore, when the controller 50 emits a 5V signal through the output lead 51, the lockout switch 70 opens the conductors 63 such that the circuit between the powertrain controller 60 and the solenoid 36 is open preventing the solenoid 36 from activating. The inability to activate the solenoid 36 is regardless of the command being presented by the powertrain controller 60 to activate the solenoid 36. It should be appreciated by those skilled in the art that any type of transistor or switch may be used based on the overall design of the controller 60. If the solenoid 36 were to deploy the solenoid plunger 42 while the notch plate 28 was rotating at high speed (counterclockwise in the Figures), the controllable coupling device 22 may operate incorrectly and may lock-up. This unintended lock-up could tie-up the transmission 24 causing the drive wheels (not shown) to lock. The rotational control assembly 20 prevents the locking of the drive wheels.

Referring to FIG. 3, the rotational control assembly 20 is shown inside the transmission 24. In this embodiment, the notch plate 28a is rotating relative to another rotating element, namely a pocket plate 72a. Hence, the controllable coupling device 22a shown in this Figure is a clutch as opposed to the brake clutch shown in the first embodiment. In addition to the difference in the clutches, the solenoid 36a operates a translator 73. The translator 73 travels along a path perpendicular to the axis of the solenoid 36a, as opposed to the solenoid plunger 42 that moves along the axis of the solenoid 36. Regardless of whether the solenoid 36, 36a acts on a solenoid plunger 42 or a translator 73, the rotatable control assembly 20 operates in the same fashion.

The pocket plate 72 is fixedly secured, either directly or indirectly, to an electric motor (not shown), the speed of which is known due to a built-in resolver. Therefore, the rotational speed of the pocket plate 72 is known because the speed of the electric motor is measured by resolver in the electric motor, discussed in greater detail subsequently. In this instance, the comparator 64 would be comparing the rotational speed of the notch plate 28 as measured by the speed sensor 48 as compared to the speed of the pocket plate 72, which is defined the resolver of the electric motor. If the difference between these two rotational speeds exceeds a predetermined threshold, the rotational control assembly 20 will prevent the solenoid 36 from energizing, thus preventing the solenoid plunger 42 from forcing the strut 44 to engage the notch 30 of the notch plate 28. In both FIGS. 3 and 4, the rotational control assembly 20 is fixedly secured to a transmission case 74 of the transmission 24.

Referring to FIG. 4, a diagram similar to that shown in FIG. 2 shows the relationship between the transmission 24, the controllable coupling device 22a, the rotational control assembly 20 (including the lockout switch 70), and the powertrain controller 60 is shown for the dynamic clutch situation wherein the notch plate 28 is moving relative to the pocket plate 72. Because this is a dynamic clutch with the notch plate 28 moving relative to the pocket plate 72, the speed of both of these races 28, 72 need to be known. A second rotational speed sensor 75 is shown providing an input to the controller 50 of the rotational control assembly 20. It is the rotational speed signals from the first speed sensor 48 and the second speed sensor 75 that are compared by the comparator 64 to determine whether the lockout switch 70 is to be opened preventing the powertrain controller 60 from activating the solenoid 36. (As stated above, the pocket plate 72 is fixed to the output shaft of an input motor, and it is the input motor resolver that is employed as the second speed sensor 75. As such, the second speed sensor 75 is not shown in the transmission 24 portion of FIG. 4.)

Referring to FIG. 5, a lever diagram 76 showing the transmission 24 having two inputs 80, 82 is shown. Up until this point, the discussion of the rotational speed sensors included a single sensor per rotating part. This was done for purposes of simplicity. The remainder of this discussion includes, however, pairs of rotational speed sensors for each rotating part. The pairs of rotational speed sensors (generically labeled "A" and "B" hereinafter) provide redundancy to the overall sensing function allowing for an additional layer of sensing/measuring to further ensure the proper function of the transmission 24.

The lever diagram 76 represents a transmission 24 that employs both static clutches (brake clutches), only requiring a single set of rotational speed sensors, and dynamic clutches, requiring first and second sets of rotational speed sensors. The lever diagram 76 is substantially similar lever diagrams shown in U.S. Pat. No. 10,711,867 and described therein in greater detail. The first 80 and second 82 inputs are electric motors. It should be appreciated by those skilled in the art that the electric motors 80, 82 may be replaced with other types of machines that produce torque without adding the concepts disclosed herein.

The first input 80 drives a first shaft 84 rotationally. The first shaft 84 is also labeled with numeral 1. The second input 82 drives a second shaft 86 rotationally. The second shaft 86 is also labeled with numeral 2. The first shaft 84 is connected to a second sun gear 90 of a second gear set of a ring carrier/ring carrier gear set, graphically represented by lever 92. The second shaft 86 is connected to first 94 and second 96 controllable coupling devices (labeled in FIG. 6 as K23 and K24, respectively). The outputs of the first 94 and second 96 controllable coupling devices are connected to third 100 and fourth 102 shafts (labeled 3 and 4, respectively). The third shaft 100 is connected to a second node 104 of the gear set 92, which represents the first ring gear and second carrier. The fourth shaft 102 is connected to the fourth node 106 of the gear set 92, which represents the first sun gear, which also extends through to a third controllable coupling device 110 (brake clutch B04). A fifth shaft 112 (labeled number 5 in FIG. 6) connects a third node 112 of the gear set 92, which represents the first carrier and the second ring gear thereof. The fifth shaft 112 is also connected to a fourth controllable coupling device 114 (brake clutch B05). Both the third 110 and the fourth 114 controllable coupling devices are connected to ground 116 (labeled 0 in FIG. 6).

In order to sense the speed of the first 84 and second 86 shafts, first and second speed sensors 120, 122 are secured within the powertrain represented by the lever diagram 76. These are redundant sensors for the first 84 and second 86 shafts as each of the first 80 and second 82 inputs are equipped with sensors or resolvers (neither shown), which also measure the rotational speed of the first 84 and second 86 shafts vis-à-vis measurements of the rotational speed of the first 80 and second 82 inputs. The third shaft 100 has two speed sensors 124, 126 to provide redundant rotational speed measurements of the third shaft 100. The fourth shaft 102 has two speed sensors 130, 132 to provide redundant rotational speed measurements of the fourth shaft 102. And the fifth shaft 112 has two speed sensors 134, 136 to provide redundant rotational speed measurements of the fifth shaft 112. It should be appreciated the speed sensors 120-136 are the same as the singular speed sensor 48 shown in FIG. 1. In FIG. 1, there is only a single speed sensor 48 for exemplary purposes, whereas there are ten speed sensors 120-136 shown in FIG. 6 to show how many speed sensors are used for each shaft 84, 86, 100, 102, 112 incorporated into the transmission 22.

Figure 6:
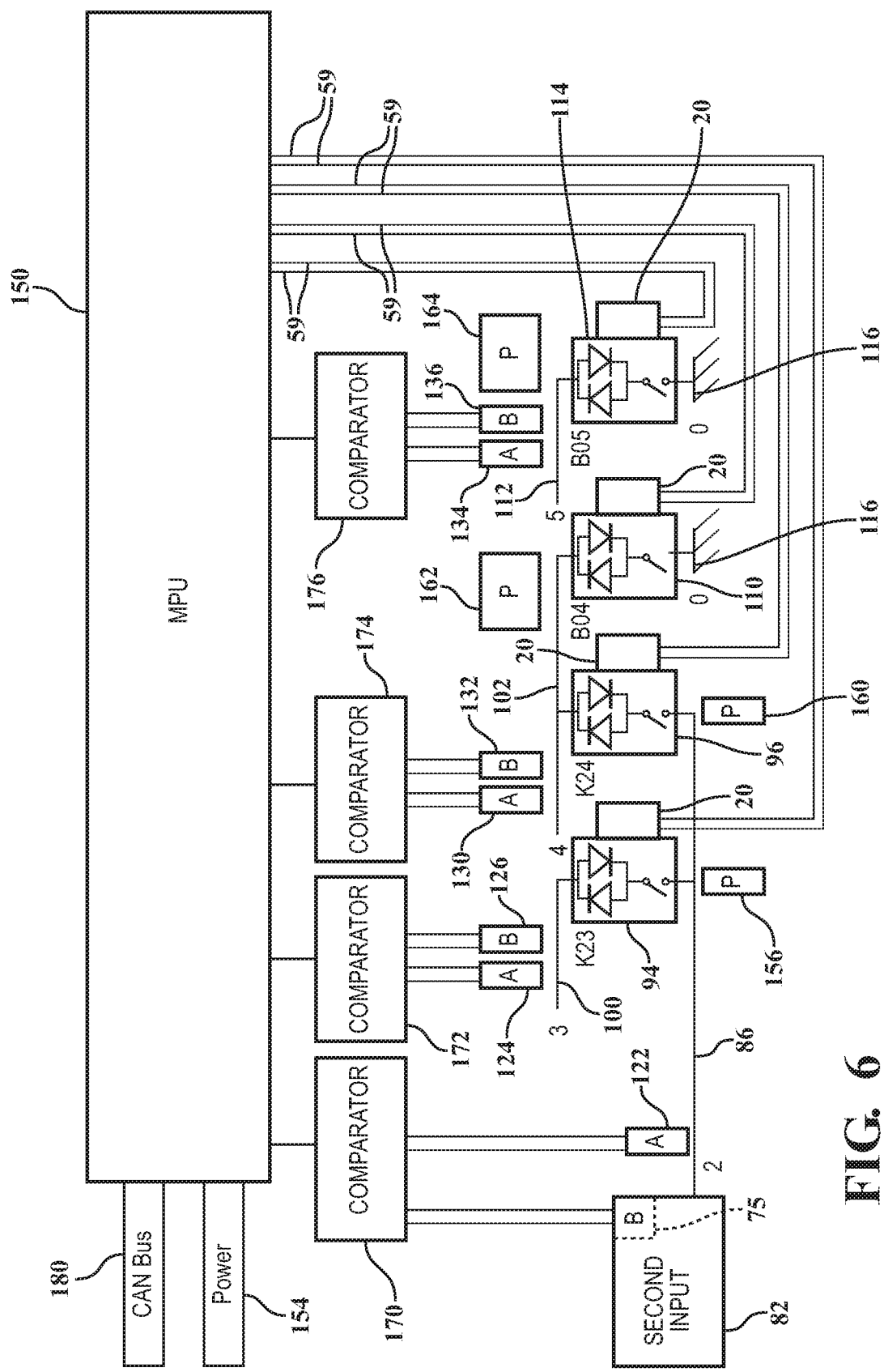
FIG. 6 is a first alternative embodiment of the rotational control assembly shown in relation to controllable coupling devices.

Referring to FIG. 6, a portion of the elements shown in FIG. 5 are shown using identical reference numerals. Only a portion are shown for purposes of simplicity as the configuration would be the same for all of the elements. Each controllable coupling device 94, 96, 110, 116 can be prevented from engaging a grounded race or another rotating race using the rotational control assembly 20, graphically represented by boxes adjacent each of the controllable coupling devices 94, 96, 110, 116. The MPI 150 receives power through a power bus 154. The power selectively energizes the solenoids 36, discussed above.

Each of the controllable coupling devices 94, 96, 110, 116 also include a position sensor 156, 160, 162, 164. The position sensors 156, 160, 162, 164 identify the position of the distal ends 54 of each of the struts 44. This information is conveyed to the MPU 150 through convention connections, which are not shown for purposes of simplicity.

The second input 82 is an electric motor and is shown to have the speed sensor 75. This is the speed sensor or resolver 75 that is built therein. The speed sensor 122 is a redundant speed sensor that measures the same rotational speed as the speed sensor 75 for the second input 82. The output signals for the two speed sensors 75, 122 are compared using a redundancy comparator 170. For purposes of this discussion, "redundancy comparator" is a term used to compare two rotational speed signals measuring the same element. This differs from the comparator 64, which compares the signal of one rotating element (the rotating notch plate 28) against either a grounded race (grounded outer race 26) or a rotating element (pocket plate 72). If the redundancy comparator 170 identifies a difference in the signals greater than a predetermined level, which is a calibratable value (50 rpm in one example), the redundancy comparator 170 will send an error signal to the MPU 150, which will note the error signal for maintenance. The MPU 150 would also determine, based on known linear slopes and known data points, which of the sensors 75, 122 is correct. The MPU 150 will operate utilizing the other of the two sensors 75, 122 until maintenance can occur.

Regardless of whether there is a discrepancy in the output signals generated by the two speed sensors 122, 166, the redundancy comparator 170 will send a signal to the MPU 150 representing the rotational speed of the second input 82, which is the same as the rotational speed of the first shaft 86.

Similarly, redundancy comparators 172, 174, 176 are used to compare the output signals of each of the speed sensors 124-136, providing error signals to the MPU 150 when necessary and the output signal representing the rotational speed the shaft 100, 102, 112, respectively. The rotational speeds are used by the MPU 150 to determine when power should be delivered to the power connection 140, 142, 144, 146 to activate the solenoids 36 associated therewith. The output signals are also transmitted out of the transmission through a CAN bus 180 to a motor control unit (not shown).

Referring to FIG. 7A, an even more simplified example of the relationship between the second 86 and fourth 102 shafts are shown. Because both shafts 86, 102 are rotating, this is a dynamic situation requiring knowledge of the differential between the two shafts 86, 102. As stated above, speed sensor pairs 75, 122 and 130, 132 provide redundancy. The outputs of the sensors are read by redundancy comparators 170, 174, respectively. The redundancy comparators 170, 174 then send the speed signals onto the MPU 150. If the speeds of the shafts 86, 102 are within a predetermined range, it is considered an appropriate period of time to engage the second coupling device 96. In one embodiment, the predetermined range is between zero and 100 rpm.

If the rotational control assembly 20 determines the rotational speed between the second 86 and fourth 102 shafts is greater than a predetermined value, it will send a signal to the MPU 150 through the conductor 59 to prevent the MPU 150 from energizing the solenoid 36.

Referring to FIG. 7B, a first alternative embodiment of FIGS. 7 and 8A is shown, also in simplified form. In this embodiment, the two speed sensors 134, 136 associated with the fifth shaft 112 (FIG. 6) are replaced with a speed sensor assembly 182. Because the fourth controllable coupling device 114 is a brake clutch (B05), this situation is static; namely only the fifth shaft 112 is rotating with the other race (0) being tied to ground 116. The speed sensor assembly 182 includes two speed sensors mounted on a single chip. The signals generated by each of the two speed sensors are reconciled within the speed sensor assembly 182. A third wire 184 emits either a 0V signal or a 5V signal which will indicate whether the fifth shaft 112 is close enough to 0 rpms that the fourth controllable coupling device 114 can be engaged using the power connection 146 from the MPU 150. If the fifth shaft 112 exceeds a predetermined speed, the MPU 150 will ignore any command to engage the fourth controllable coupling device 114.

Figure 8:
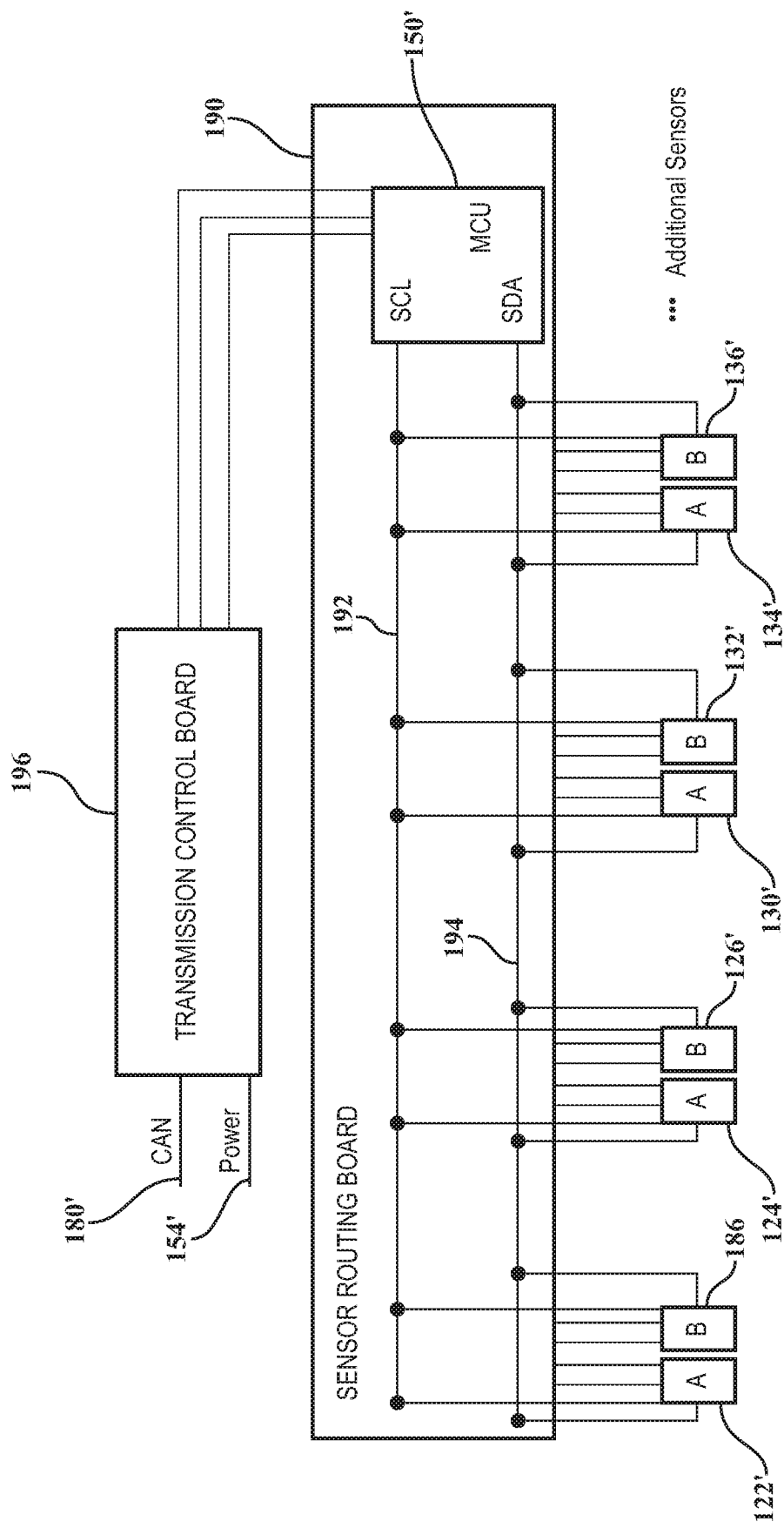
FIG. 8 is a second alternative embodiment of the rotational control assembly.

Referring to FIG. 8, a second alternative embodiment is shown, wherein like primed reference numerals represent similar elements to those discussed above. In this embodiment, the sensor from the first input (motor) 80 is not used; a second speed sensor 186 is used and the pair 122', 186 operate in a fashion similar to the other pairs 124', 126'; 130', 132'; 134', 136'. Additional sensor pair are used as needed, depending on the transmission used.

The speed sensors 122', 124', 126', 130', 132', 134', 136', 186 each have four connections. The four connections will be discussed subsequently. The speed sensors 122'-136', 186 are connected to a sensor routing board 190. The sensor routing board 190 has the MCU 150' fixedly secured thereto. The sensor routing board 190 includes a sensor clock line 192 and a sensor data acquisition line 194. Both of these lines are electrically connected to the MCU 150' at one end and each of the speed sensors 122'-136', 186 to control them and to receive the speed signals therefrom. In this embodiment, the MCU 150' is low cost 8-bit micro processing unit that can compare rotational speeds to allow or disallow shifts in the transmission. Digital communication from the speed sensors 122', 124', 126', 130', 132', 134', 136', 186 to the MCU 150' are used for voting and lockout schemes. With the MCU 150' receiving the rotational speed signals and controlling the solenoids 36, data does not have to be transmitted to the transmission control board 196. By avoiding communication with the transmission control board 196, the rotational control assembly 20 is able to react quicker while minimizing the opportunities for errors in the communication to occur.

Figure 9:
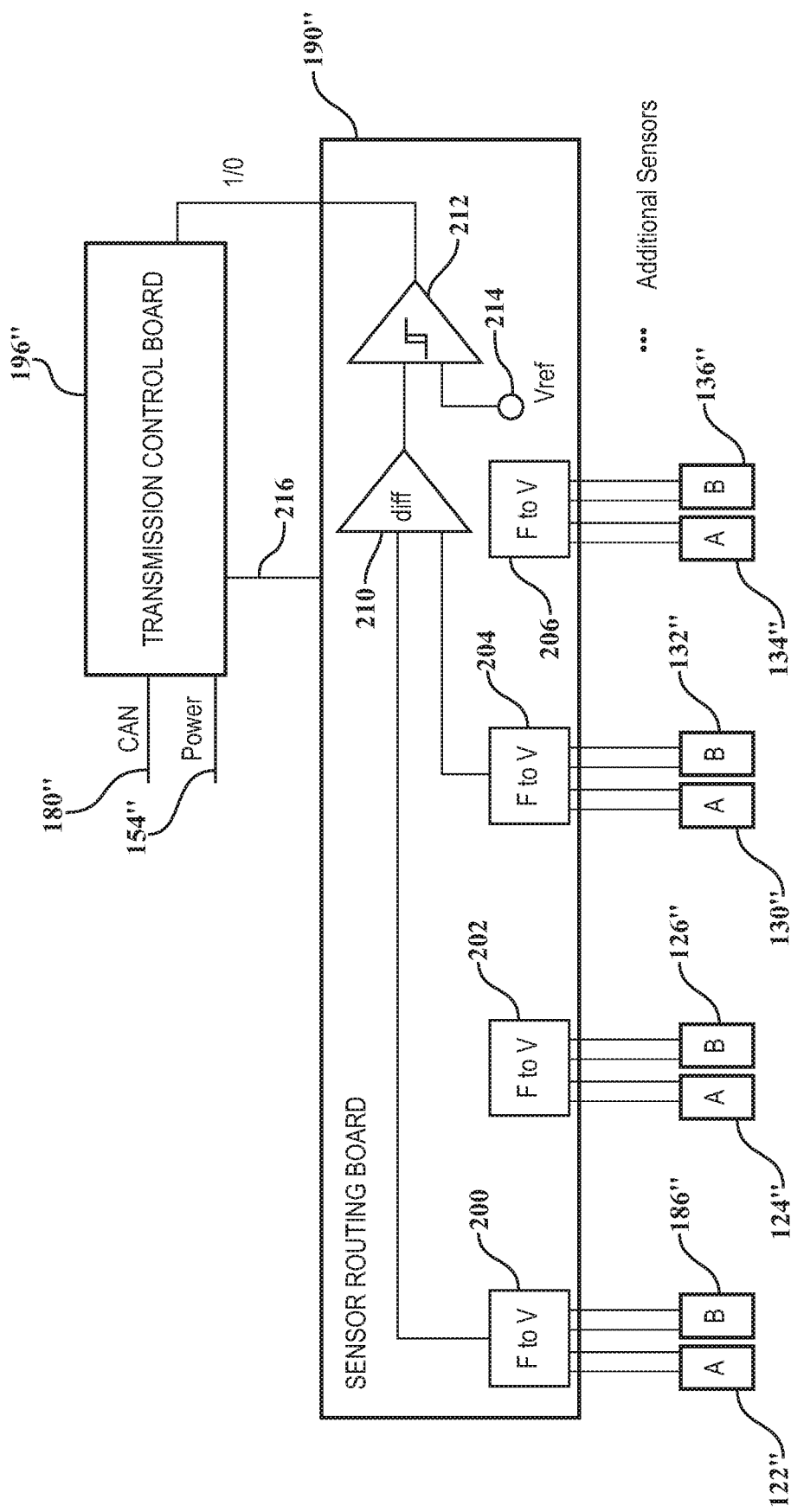
FIG. 9 is a third alternative embodiment of the rotational control assembly.

Referring to FIG. 9, a third alternative embodiment is shown, wherein like double primed reference numerals represent similar elements to those discussed above. In this embodiment, only two speed sensor pairs 122", 186" and 130", 132" are completely connected for purposes of simplicity. Each of the pairs of speed sensors 122", 186", 124", 126", 130", 132", 134", 136" is electrically connected to a frequency-to-voltage converter 200, 202, 204, 206, respectively. The frequency-to-voltage converters 200, 202, 204, 206 receive a frequency output from the speed sensors 122", 186", 124", 126", 130", 132", 134" and converts the signals to an analog voltage. Two of the frequency-to-voltage converters 200, 204 have outputs that are received by a differential amplifier 210. (The outputs from the other frequency-to-voltage converters are as well but are not shown for purposes of simplicity.)

Figure 10:
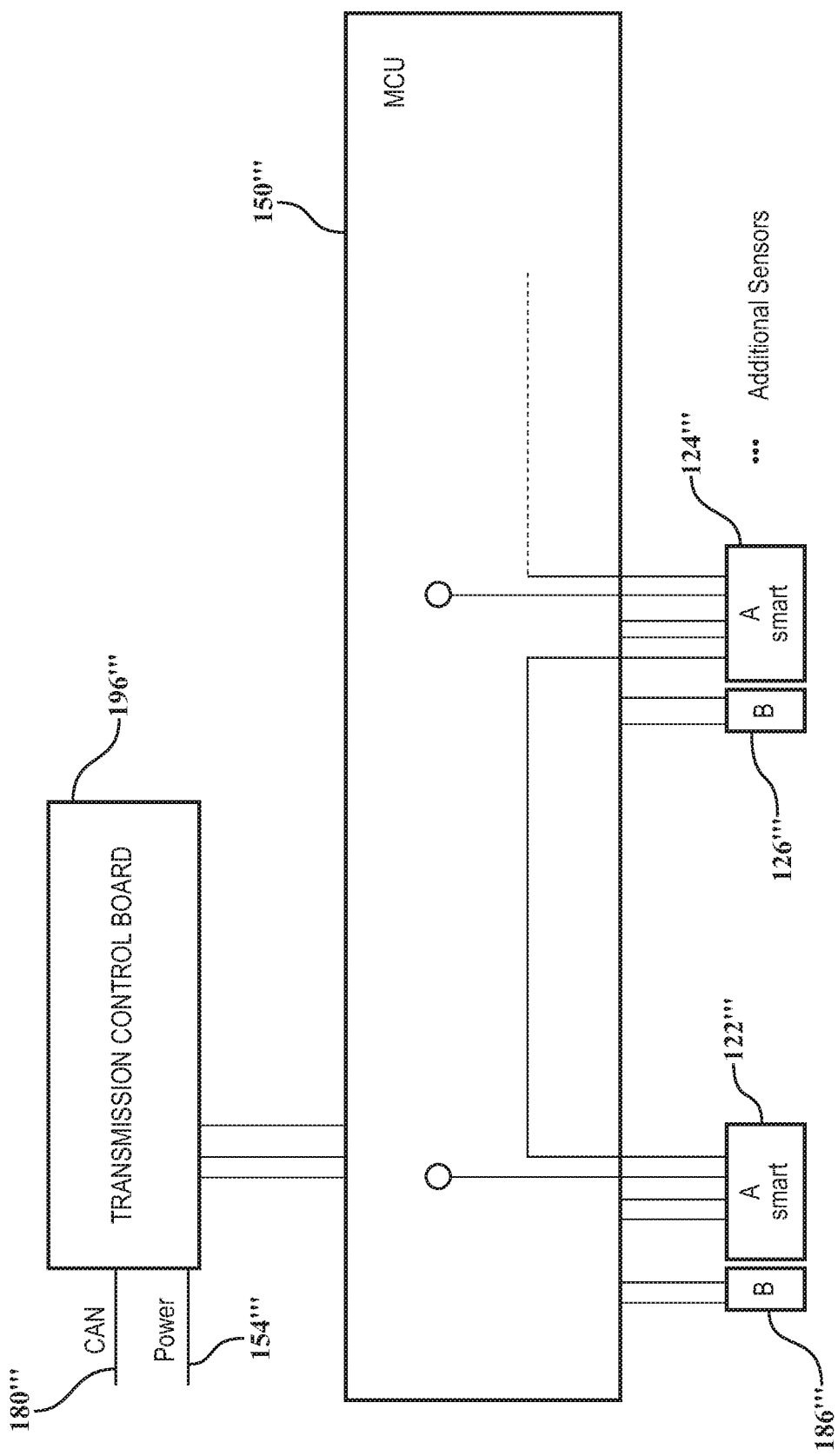
FIG. 10 is a fourth alternative embodiment of the rotational control assembly.

The output of the differential amplifier 210 is input into a Schmitt trigger 212, which also receives a reference voltage 214 as a second input. The output of the Schmitt trigger 212 is a digital signal (I/O) due to the hysteresis feature of the Schmitt trigger 212. This digital output from the Schmitt trigger 212 is received by the transmission control board 196", as is shown in FIG. 10, or it can be routed through an intermediate sensor processor (not shown). A raw sensor output line 216 provides untransformed measurements from the sensors directly to the transmission control board 196".

Referring to FIG. 10, a fourth alternative embodiment is shown, wherein like triple primed reference numerals represent similar elements to those discussed above. In this embodiment, only two speed sensor pairs 122''', 186''' and 124''', 126''' are shown for purposes of simplicity. One of the speed sensors 122''', 124''' in each of the two speed sensor pairs 122''', 186'''; 124''', 126''' is a smart sensor in that it has logic circuitry built therein. The smart speed sensors 122''', 124''' can read the signal generated by the other speed sensor 186''', 126''' in their respective pair, eliminating the need to have separate circuitry to perform the redundancy check on the operability of the rotational control assembly 20". The output of the speed sensor pairs 122''', 186''' and 124''', 126''' is a digital output that will override any instruction to engage the rotational control assembly 20''' if the output of the smart sped sensors 122''', 124''' is transmitted to the transmission control board 196'''.

Figures 11A, 11B:
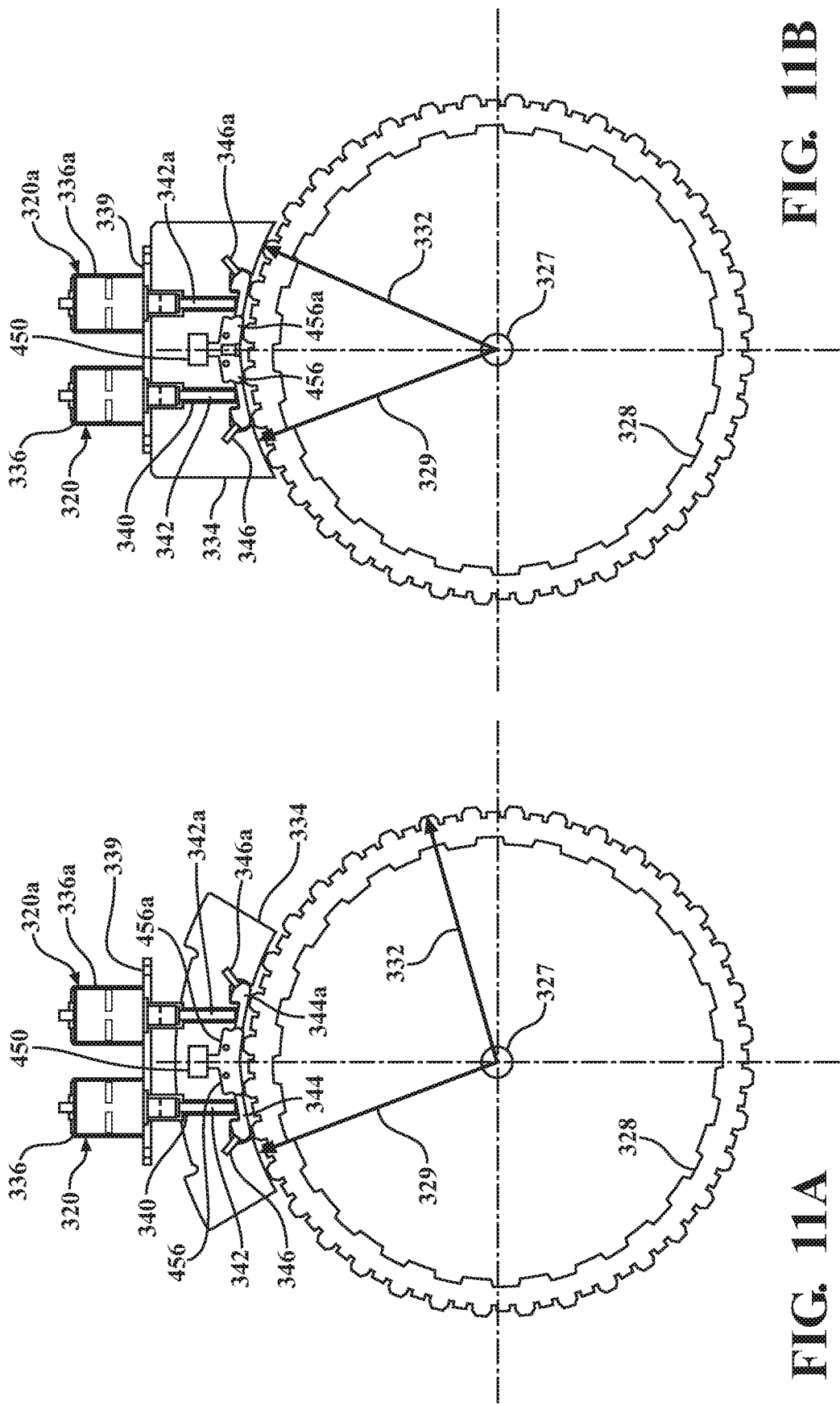
FIGS. 11A and 11B are side views of first and second park/hill hold embodiments of the rotational control assembly.

Referring to FIG. 11A, a fifth alternative embodiment of the rotational control assembly is generally shown at 320, with reference numerals of similar elements offset from those used for the first embodiment by 300. The fifth embodiment 320 is configured to facilitate the functions of vehicular park and vehicular hill-hold. The rotational control assembly 320, together with the controllable coupling device 322 act as a brake clutch, whereby the rotational control assembly 320 prevents the rotating notch plate/race 328 from moving in one direction. Because a second rotational control assembly 320a mirrors the rotational control assembly 320, the controllable coupling device 320 prevents the rotating notch plate 328 from moving in either direction when the rotational control assemblies 320, 320a are engaged.

The rotational control assemblies 320, 320a share a lock housing 334. In the embodiment shown in FIG. 12A, the lock housing 334 extends through an arc and is fixedly secured, either directly or indirectly, to the transmission case of the transmission. The lock housing 334 is coaxial with the notch plate 326, with both having a central axis 327. having an inner diameter 335 that is slightly larger than an outer diameter 337 of the notch plate 326. The lock housing 334 defines an interior surface 341 at its inner diameter 335 that extends through a defines a minor circular arc less than 90 degrees. In the embodiment shown, the interior surface 341 extends through a minor circular arc approximately 45 degrees. The solenoids 336, 336a are mounted to a mounting plate 339, which is fixedly secured to the transmission housing (not shown in this Figure). The speed sensor 348, positions sensors 456, 456a, struts 344, 344a and return springs 346, 346a are all housed within a single housing port 340 within the lock housing 334. This design increases manufacturing efficiency, reduces weight, and frees up valuable space within the transmission housing.

Referring to FIG. 11B, the controllable coupling device 322 is identical to the embodiment shown in FIG. 11A with the exception that mounting plate 339 is mounted to the lock housing 334 in addition to being secured to the transmission housing. More specifically, the lock housing 334 in FIG. 11B extends up further away from the notch plate 328 toward the solenoids 336, 336a.

The assembly has been described in an illustrative manner. It is to be understood that the terminology, which has been used, is intended to be in the nature of words of description rather than of limitation.

Many modifications and variations of the assembly are possible in light of the above teachings. Therefore, within the scope of the appended claims, the assembly may be practiced other than as specifically described.

We claim:

1. A rotational control assembly for controlling at least one locking element used to lock at least one race with respect to an object, said rotational control assembly comprising:
   at least one speed sensor sensing a rotational speed representing a race rotational speed of the at least one race, and generating a rotational speed signal;
   a controller electrically connected to said at least one speed sensor for receiving said rotational speed signal, said controller including at least one comparator to compare said rotational speed signal to a threshold speed level; and
   a lockout switch electrically connected to said controller, said lockout switch preventing activation of the at least one locking element when said rotational speed signal exceeds said threshold speed level.

2. A rotational control assembly as set forth in claim 1 wherein said at least one speed sensor is disposed adjacent the at least one race.

3. A rotational control assembly as set forth in claim 1 wherein said at least one speed sensor is disposed a rotating element operationally in sync with the at least one race.

4. A rotational control assembly as set forth in claim 1 wherein said lockout switch is a MOSFET defining a gate electrically connected to said speed sensor.

5. A vehicle transmission assembly comprising:
   a transmission case;
   at least one controllable coupling device having at least one race selectively rotatable within said transmission case;
   a locking element selectively preventing the rotation of said at least one race with respect to said transmission case;
   at least one speed sensor sensing a rotational speed representing a race rotational speed of the at least one race, and generating a rotational speed signal;
   a controller electrically connected to said speed sensor for receiving said rotational speed signal, said controller including a comparator to compare said rotational speed signal to a threshold speed level; and
   a lockout switch electrically connected to said controller, said lockout switch preventing activation of said locking element when said rotational speed signal exceeds said threshold speed level.

6. A vehicle transmission assembly as set forth in claim 5 including a locking element activator to move the locking element between an unactivated position and an activated position.

7. A vehicle transmission assembly as set forth in claim 6 wherein said locking element activator is a solenoid.

8. A vehicle transmission assembly comprising:
   a transmission case;
   a first race selectively rotatable within said transmission case;
   a second race disposed adjacent said first race, said second race selectively rotatable within said transmission case independently of said first race;
   a locking element selectively locking said first race to said second race;
   a first speed sensor sensing a first rotational speed representing a first race rotational speed of said first race, and generating a first rotational speed signal;
   a second speed sensor sensing a second rotational speed representing a second race rotational speed of said second race, and generating a second rotational speed signal;
   a controller electrically connected to said first and second speed sensors for receiving said first and second rotational speed signals, said controller including a comparator to compare said first and second rotational speed signals and generate a difference signal representing the difference between said first and second rotational speed signals; and
   a lockout switch electrically connected to said comparator, said lockout switch preventing activation of said locking element when said difference signal exceeds a predetermined threshold level.

9. A vehicle transmission assembly as set forth in claim 8 including a locking element activator to move the locking element between an unactivated position and an activated position.

10. A vehicle transmission assembly as set forth in claim 9 wherein said locking element activator is a solenoid.

11. A vehicle transmission assembly as set forth in claim 8 wherein said first speed sensor is disposed adjacent said first race.

12. A vehicle transmission assembly as set forth in claim 8 wherein said first speed sensor is disposed a rotating element operationally in sync with said first race.

13. A vehicle transmission assembly as set forth in claim 8 wherein said second speed sensor is disposed adjacent said second race.

14. A vehicle transmission assembly as set forth in claim 8 wherein said second speed sensor is disposed a rotating element operationally in sync with said second race.

15. A rotational control assembly for use with a vehicle transmission having a transmission case, said rotational control assembly comprising:
   a lock housing fixedly secured to the transmission case, said lock housing defining an inner diameter;
   at least one race selectively rotatable within said transmission case, said at least one race defining an outer diameter less than said inner diameter of said lock housing;
   a first locking element selectively preventing the rotation of said at least one race with respect to the transmission case in a first direction;
   a second locking element selectively preventing the rotation of said at least one race with respect to the transmission case in a second direction opposite said first direction;
   at least one speed sensor sensing a rotational speed representing a race rotational speed of the at least one race, and generating a rotational speed signal;
   a controller electrically connected to said speed sensor for receiving said rotational speed signal, said controller including a comparator to compare said rotational speed signal to a threshold speed level; and
   a lockout switch electrically connected to said controller, said first lockout switch preventing activation of said locking element when said rotational speed signal exceeds said threshold speed level.

16. A vehicle transmission assembly as set forth in claim 15 wherein said lock housing defines a single housing port for receiving said first and second locking elements and said rotational speed sensor therein.

17. A vehicle transmission assembly as set forth in claim 16 including a first locking element activator extending through said single housing port to selectively engage said first locking element.

18. A vehicle transmission assembly as set forth in claim 17 including a second locking element activator extending through said single housing port to selectively engage said second locking element.

19. A vehicle transmission assembly as set forth in claim 15 wherein said interior surface of said lock housing defines a minor circular arc.

20. A vehicle transmission assembly as set forth in claim 19 wherein said interior surface of said lock housing defines a minor circular arc less than 90 degrees.

* * * * *